United States Patent
Koravadi

(10) Patent No.: US 11,943,390 B1
(45) Date of Patent: Mar. 26, 2024

(54) SYSTEM AND METHODS FOR EASY, SECURE, ERROR FREE AND CONTROLLED INFORMATION SHARING VIA AUDIO COMMUNICATION

(71) Applicant: Krishna Koravadi, Rochester Hills, MI (US)

(72) Inventor: Krishna Koravadi, Rochester Hills, MI (US)

(73) Assignee: Krishna Koravadi, Rochester Hills, MI (US)

( * ) Notice: Subject to any disclaimer, the term of this patent is extended or adjusted under 35 U.S.C. 154(b) by 0 days.

(21) Appl. No.: 18/224,075

(22) Filed: Jul. 20, 2023

Related U.S. Application Data

(60) Provisional application No. 63/413,628, filed on Oct. 6, 2022.

(51) Int. Cl.
| | |
|---|---|
| *H04M 3/493* | (2006.01) |
| *G10L 17/02* | (2013.01) |
| *G10L 17/22* | (2013.01) |
| *H04M 3/51* | (2006.01) |
| *H04M 7/00* | (2006.01) |

(52) U.S. Cl.
CPC .......... *H04M 3/4936* (2013.01); *G10L 17/02* (2013.01); *G10L 17/22* (2013.01); *H04M 3/5166* (2013.01); *H04M 3/5191* (2013.01); *H04M 7/0021* (2013.01); *H04M 2201/405* (2013.01)

(58) Field of Classification Search
CPC ............ H04M 3/4936; H04M 3/5166; H04M 3/5191; H04M 7/0021; H04M 2201/405; G10L 17/02; G10L 17/22
See application file for complete search history.

(56) References Cited

U.S. PATENT DOCUMENTS

| | | | | |
|---|---|---|---|---|
| 6,680,999 B1* | 1/2004 | Garcia | ................... | G16H 10/60 |
| | | | | 379/93.12 |
| 9,509,674 B1* | 11/2016 | Nasserbakht | ....... | G06F 21/6218 |
| 9,734,169 B2* | 8/2017 | Redlich | ................... | G06F 16/21 |
| 11,516,196 B1* | 11/2022 | Barrows | ................. | H04L 63/08 |
| 2005/0193198 A1* | 9/2005 | Livowsky | ............... | G06F 21/32 |
| | | | | 713/168 |
| 2012/0054058 A1* | 3/2012 | Petrelli | ................... | G06Q 40/04 |
| | | | | 705/27.2 |
| 2015/0172366 A1* | 6/2015 | Bezos | ..................... | H04L 12/66 |
| | | | | 709/217 |
| 2015/0358790 A1* | 12/2015 | Nasserbakht | ........... | G06F 21/32 |
| | | | | 726/19 |

(Continued)

*Primary Examiner* — Akelaw Teshale

(57) ABSTRACT

Embodiments herein disclose methods and systems for a simple, error free, secure, and controlled information sharing through an audio communication. The system is configured to facilitate the audio communication, generate permanent unique identification number, store map between permanent unique user identification number to the user information to share, facilitate secure and controlled information sharing and easy retrieval of error free shared information through a secure communication mechanism between a client application and a centralized server application. Embodiments herein facilitate user to communicate the permanent unique identification number over the audio communication in place of error free information to be communicated with a caller, by executing the client application and the centralized server application.

11 Claims, 13 Drawing Sheets

(56) References Cited

U.S. PATENT DOCUMENTS

| | | | |
|---|---|---|---|
| 2016/0103652 A1* | 4/2016 | Kuniansky | H04L 65/00 700/94 |
| 2016/0171202 A1* | 6/2016 | Goad | H04W 4/80 726/5 |
| 2021/0142780 A1* | 5/2021 | Shanbhag | G06Q 10/10 |
| 2023/0031644 A1* | 2/2023 | St. Martin | G06F 21/552 |

* cited by examiner

| Unique smyinfo ID 205 | User information 206 |
|---|---|
| 10345961 | Full Name:<br>Address:<br>Phone number:<br>Default info to share configuration:<br>Approver to share the info:<br>Voice biometric:<br>Social networking profile links: Facebook, Linkedin etc..<br>Financial account links: Paypal, Venmo etc..<br>Other documents: Driving license, Passport etc..<br>Others: |
| 10345962 | .... |
| ..... | ..... |

FIG. 3

SYSTEM AND METHODS FOR EASY, SECURE, ERROR FREE AND CONTROLLED INFORMATION SHARING VIA AUDIO COMMUNICATION

CROSS REFERENCE TO RELATED APPLICATION

This application is based on and derives the benefit of the U.S. Provisional Application 63/413,628 dated Oct. 6, 2022, the contents of which are incorporated herein by reference.

TECHNICAL FIELD

Embodiments herein relate to information sharing over phone and, more particularly, to systems and methods for easy, secure, and controlled information sharing via audio communication over phone.

BACKGROUND

During most of the audio conversations over phone it may be needed to communicate the full name so that the other party can record the full name with no errors. Name is one such example it could be any information that needs to be communicated error free over audio communication.

To address this problem, the individual may articulate their name, but due to variations in pronunciation, the recipient may perceive a different spelling. An alternative approach known to address this issue involves employing words that represent the letters of the name during spelling, such as utilizing "E" for Echo, "L" for Lima, "I" for India, "J" for Juliett, "A" for Alpha, and "H" for Hotel in the case of the name Elijah. However, this method proves to be time-consuming and exasperating, particularly when the recipient requests repetitions. Both the duration required and the frustration experienced amplify proportionally based on the intricacy and length of the name. Similarly, when conveying vital information like addresses and email IDs during audio calls, there is an additional time and effort investment necessary to ensure the accurate transmission of error-free data.

A current solution discloses a fully automated assistant system that aids users in executing diverse actions. However, the current solution is limited in its capacity to handle dynamic responses from conversing individuals and does not address the challenge of effectively communicating error-free essential personal information during audio conversations, followed by human interaction, which falls outside the scope of complete automation. Consequently, advancements in this field are therefore required.

BRIEF DESCRIPTION OF THE FIGURES

The embodiments disclosed herein will be better understood from the following detailed description with reference to the drawings, in which:

FIG. 3 illustrates a table showing user information and unique IDs stored in databases, according to embodiments as disclosed herein;

DETAILED DESCRIPTION OF EMBODIMENTS

Figure 1:
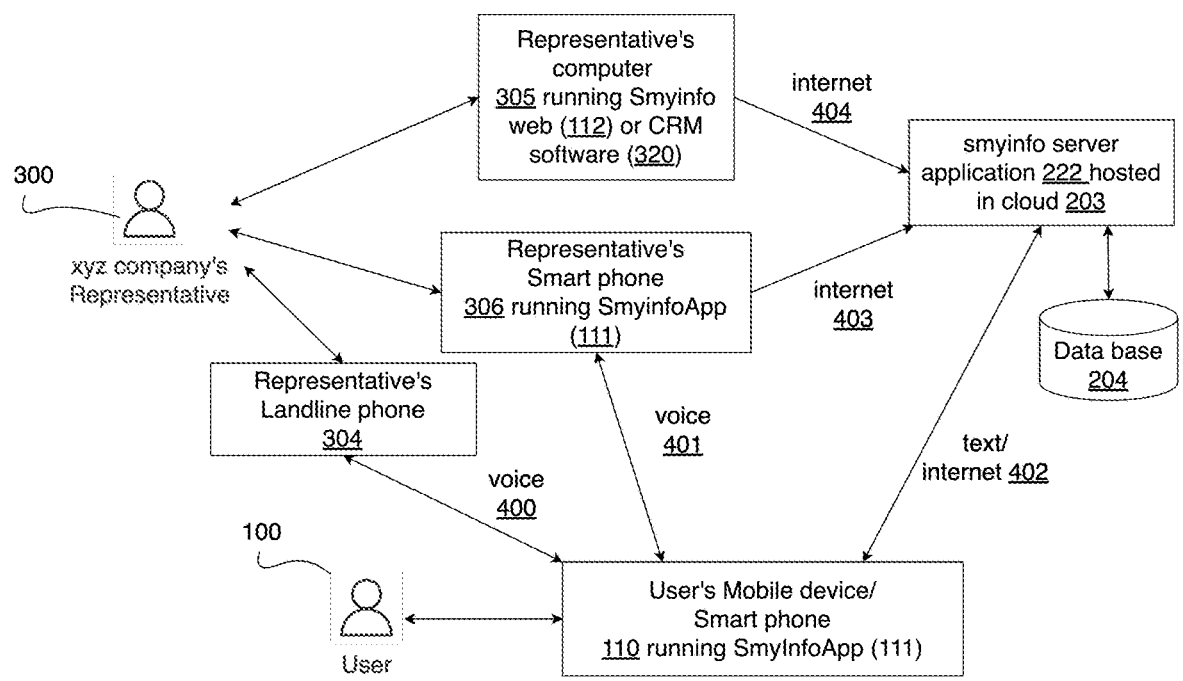
FIG. 1 illustrates a system for easy, fast, secure, error free & controlled personal information sharing, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose methods and systems for easy, fast, secure, error free & controlled personal information sharing system during the audio conversation. Referring now to the drawings, and more particularly to FIGS. 1 through 13, where similar reference characters denote corresponding features consistently throughout the figures, there are shown embodiments.

FIG. 1 illustrates a system for easy, fast, secure, error free, and controlled personal information sharing during the audio conversation, according to the embodiments disclosed herein. The system facilitates audio communication. The system comprises a mobile phone/smart phone device (110) that comprise an application, namely the Smyinfo App (111). Smyinfo is an application that is hosted on a server, configured to enable information sharing. The system is connected to a cloud computing infrastructure (203) hosting the Smyinfo application server (222). The user (100) utilizes the mobile phone/smart phone device (110) to establish a voice link (400) with the company's representative (300) via a land line phone (304), or a smart phone/mobile phone (306) through a voice channel (401). The company's representative, or other user (300) utilize the Smyinfo app (111), or web site (112) running on the smart phone (306) to access user information from the Smyinfo application server (222) over the Internet (403). Alternatively, according to the embodiments disclosed herein, the company's representative or the other user (300) utilize computer (305) running the CRM or Business software (320), or Smyinfo website (112), to access the user information from the Smyinfo application server (222) via internet (404). The user information is securely stored in the secure data base (204). The system is configured to store a map between the permanent unique user identification number to the corresponding user information to share. The system facilitates a secure and controlled information sharing and easy retrieval of error free shared information through a secure communication mechanism between a client application and a centralized server application. The system is configured to automate communication with a caller by executing the client application and the centralized server application.

Figure 2:
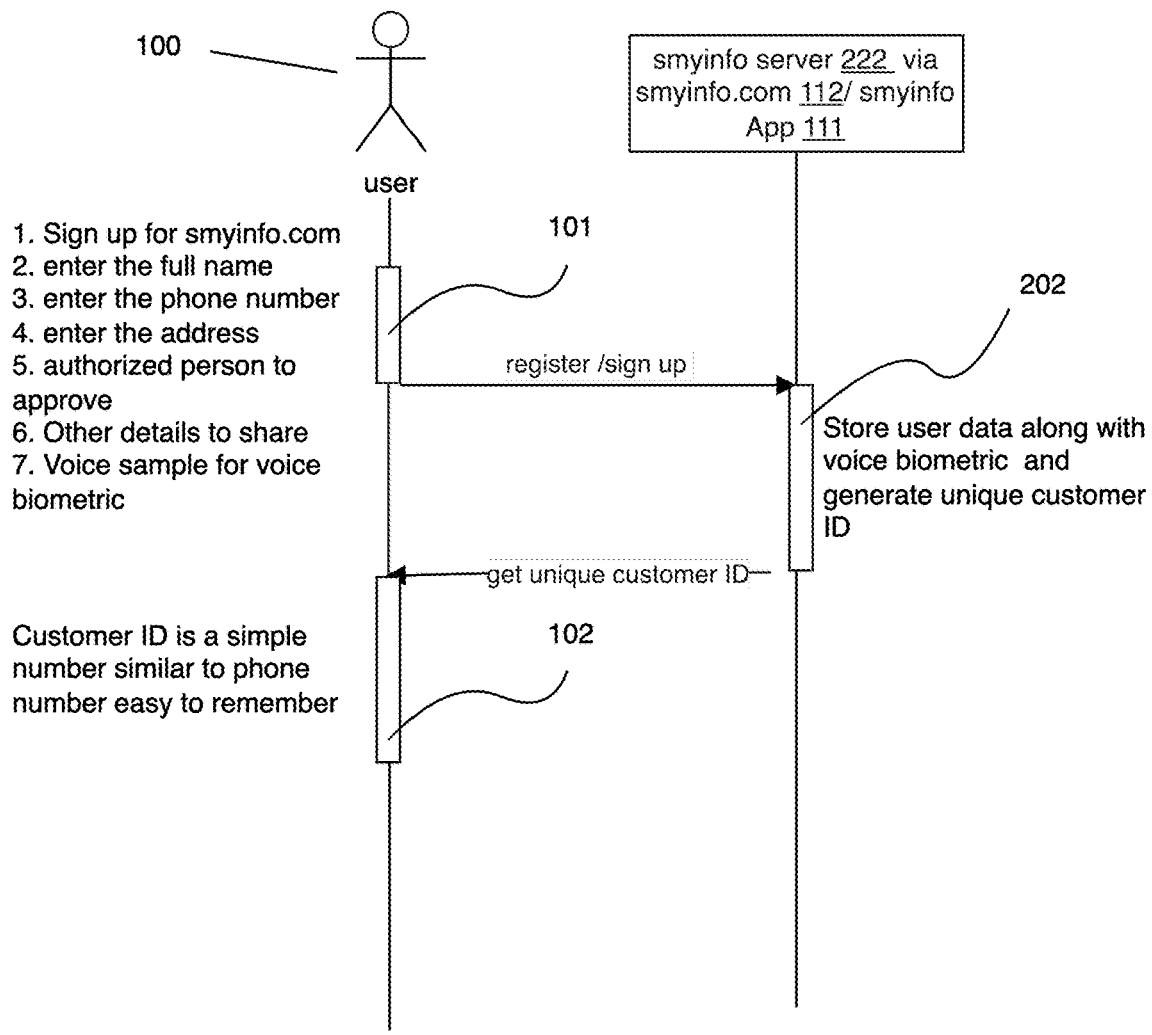
FIG. 2 illustrates a sequence diagram of registration process, according to embodiments as disclosed herein.

FIG. 2 illustrates the sequence diagram of the user registration process, according to the embodiments disclosed herein. The user (100) interacts with Smyinfo.com (112) or the Smyinfo app (111) to obtain a permanent unique user identification number (205). During this process, the user (100) utilizes a computing device, such as, but not limited to, a personal computer, or a smart phone (110) to register with the Smyinfo application server (222). The user enters all necessary personal information (206), such as full name, address, email id, authorized person's details, and the like, which are necessary to be shared during the audio conversation with other user or the company's representative (300) as described in the step (101). The user can enter the information to share over audio communication to a centralized server application utilizing one of a web interface and a client application running on a smart mobile device. Once all the personal information along with generated voice biometric of the user is saved in the data base (204), at step 202, the Smyinfo server application (222) generates a permanent unique customer identification number (205) as shown in FIG. 3. The user can share the permanent unique identification number, during an audio conversation, when the entered information is needed to be communicated. The receiver can enter the user's permanent unique identification number. Entering the user's permanent unique identification number comprises entering the information into one of a CRM, a business application, a mobile client application, and a web interface to retrieve the information the user has shared. The permanent unique customer identification number (205) can be easily communicated over audio communication without errors and is independent of the length or complexity of the user's personal information (206) as mentioned above.

Figure 4:
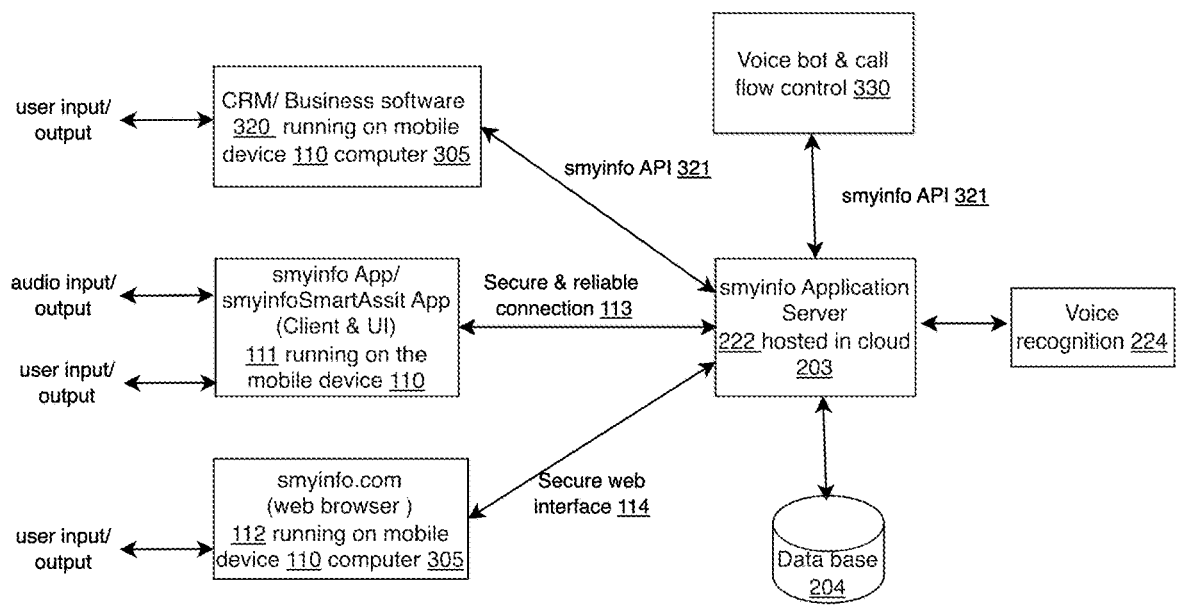
FIG. 4 illustrates an overview of Smyinfo system components, according to embodiments as disclosed herein.

The various actions in FIGS. 2 and 3 may be performed in the order presented, in a different order or simultaneously. Further, in some embodiments, some actions listed in FIGS. 2 and 3 may be omitted FIG. 4 illustrates the components of the Smyinfo, according to the embodiments herein. The components of the Smyinfo comprise the Smyinfo application server (222) that runs on the cloud infrastructure (203). The Smyinfo application server (222) interacts with CRM/Business software (320) through the Smyinfo API (321), and with web browsers (112) via a secure web interface (114) to facilitate simultaneous connections. The Smyinfo application server (222) incorporates logic for generating permanent unique identification numbers and efficiently stores and retrieves user information (206) from the database (204) based on the corresponding permanent unique identification numbers (205). When voice bot is interacting with the caller, voice bot & call flow control (330) interact with the Smyinfo application server (222) via the Smyinfo API (321). The Smyinfo application server (222) is interfaced with voice recognition module (224) to generate the voice biometric during registration process and user recognition utilizing user voice during the automatic permanent user identification number extraction process. The user interacts with the CRM/Business software (320) via input/output interfaces, such as, but not limited to, a key board, a mouse, touch screen, display screen, and the like. The Smyinfo App (111) comprises a client and a user interface (UI) UI running on the mobile device (110). The user interacts with the Smyinfo App (111) through an audio input interface, such as, but not limited to, a microphone, or an output interface, such as, but not limited to, an audio speaker as well as a user input interface, such as, but not limited to, touch and output, such as a mobile device screen. Alternatively, the user can utilize a web browser running on the mobile device (110), or computer (305) to access the Smyinfo.com (112) through input, such as, but not limited to, a touch interface, a mouse, or a keypad, and visualize the UI contents via the display interface.

Figure 5:
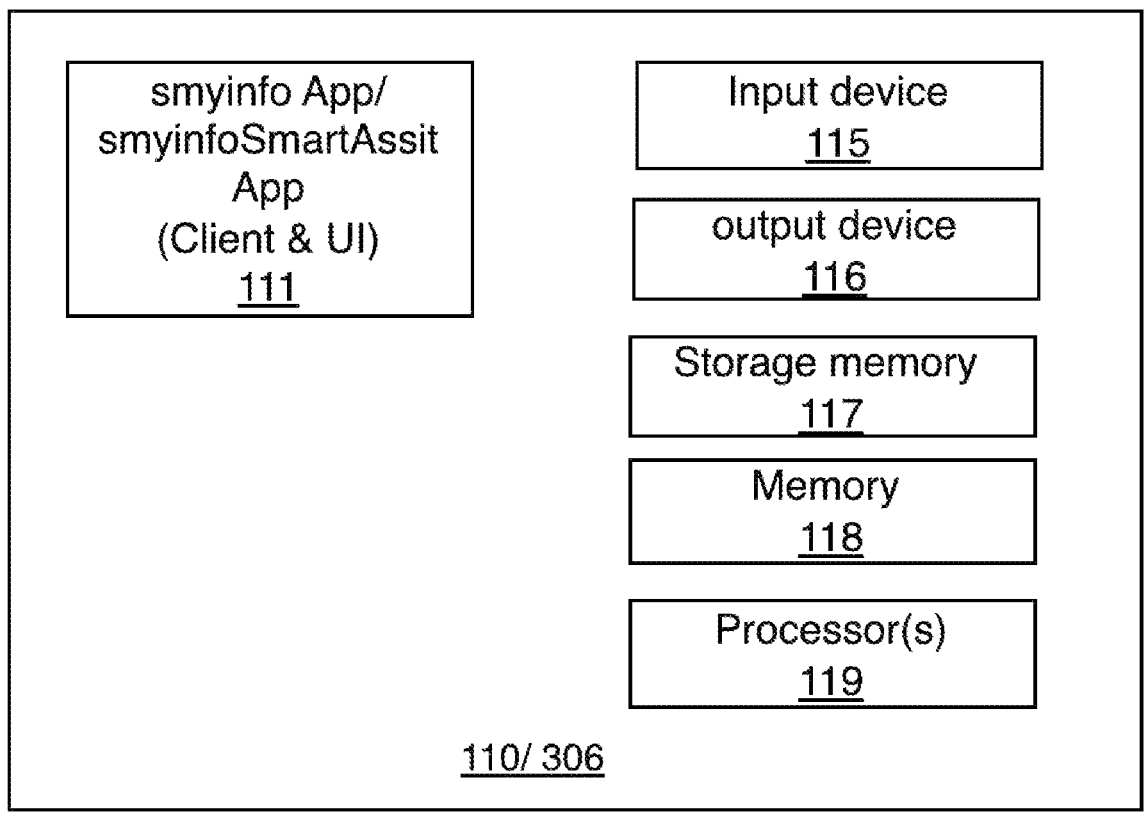
FIG. 5 illustrates mobile device components, according to embodiments as disclosed herein.

FIG. 5 illustrates components of the mobile computing device (110 or 306), according to the embodiments as disclosed herein. The mobile computing device (110 or 306) comprises an input device (115), such as, but not limited to, a micro phone (500), a touch interface (502), voice communication channels (400, 401), internet/text channel (402), and the like. The mobile computing device (110 or 306) comprises an output device (116), such as, but not limited to, a display, a speaker (501), voice communication channels (400, 401), internet channel (402), and the like. The mobile computing device (110 or 306) comprises a storage memory (117), such as, but not limited to, a Flash memory, where the application code and the nonvolatile application data is stored. The mobile computing device (110 or 306) comprises a memory (118), such as, but not limited to, a RAM which is used by the application during program execution. The mobile computing device (110 or 306) comprises a processor(s) (119) which executes the Smyinfo application code (111).

Figure 6:
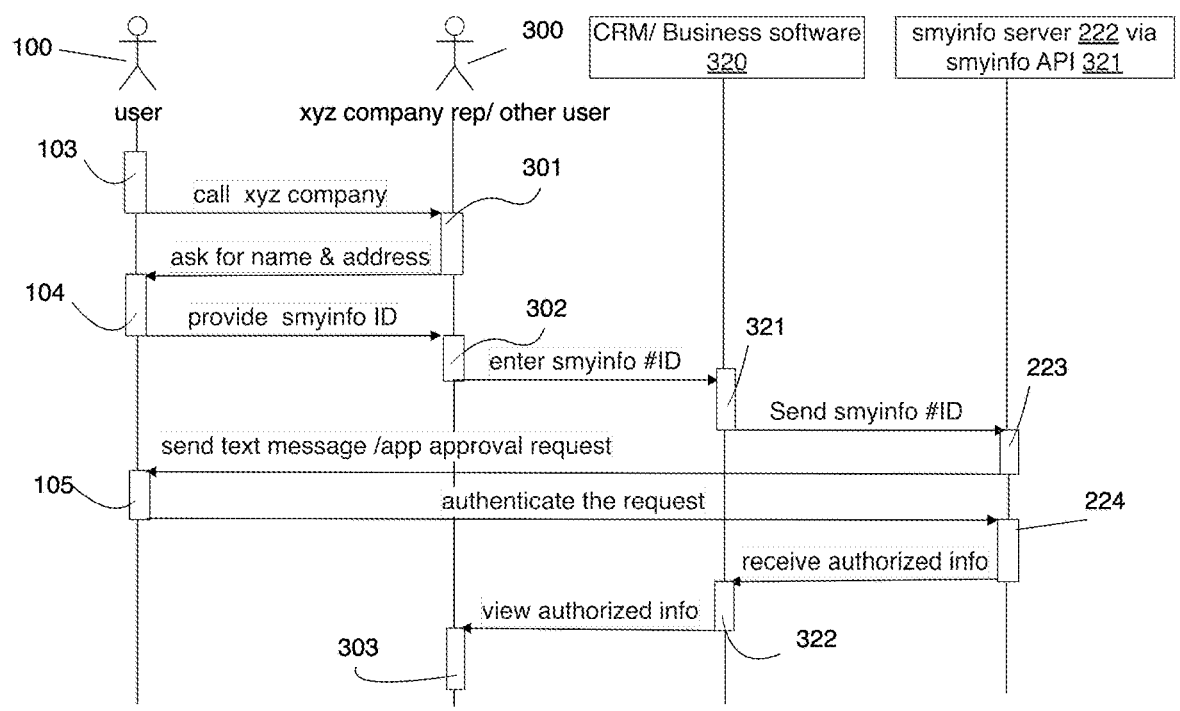
FIG. 6 illustrates a flow diagram for easy, fast, secure, error-free, and controlled personal information sharing via API, according to embodiments as disclosed herein.

FIG. 6 illustrates the sequence diagram of easy, fast, secure, error free method of communicating user's (100) personal information to other user's (200) CRM/business software (320) via Smyinfo API (321), according to the embodiments disclosed herein. At step 103, the user (100) calls the other user, or the company's representative (300). The user enters information to share over audio communication to a centralized server application utilizing one of a web interface and a client application running on a smart mobile device and receiving the permanent unique identification number. At step 104, on sending the request to provide the personal information (206) as described in step 301, the user provides the Smyinfo user identification number (205) over audio communication. At step 302, the other user, or the company's representative (200) enters the Smyinfo user ID (205) into the CRM or business software (320). The information can be also entered into a mobile client application, and a web interface to retrieve the information the user has shared. At step 321, the CRM or business software (320) internally calls the Smyinfo API (321) to retrieve the user's personal information (206) based on the permanent unique user ID (205) provided by the user (100) over audio call. At step 223, the Smyinfo server (222) sends a notification via text or an app to the person who is registered as an authorized person to approve the request to share the requested personal information. A centralized server application requests for permission to share the information by sending the notification to the authorized person who is designated to approve in a database through either a text, or an alert to the client application. At step 105, the user (100) approves the selected personal information to share with the other user utilizing the Smyinfo app (111) or text command. The person who is registered as an authorized person to approve the request to share the personal information could be the user, or any family member, such as, but not limited to, parent or a guardian of a child or spouse, and the like. At step 322, on receiving the authorization, the Smyinfo server (222) shares the authorized set of data which belongs to the user via Smyinfo API (321) to the CRM or business software (320). On receiving the notification, an option is provided to the authorized person, the option being either full access, or partial access, or rejecting the request utilizing either the client application or the web interface. At step 303, the company representative, or the other user can see all the personal details in the CRM/Business software (302) and can continue with further conversation with the user. After the authorized person acts on the approval request to share, the centralized server application shares the authorized user data using the web interface, the client application, and populates the CRM, or the business application.

Figure 7:
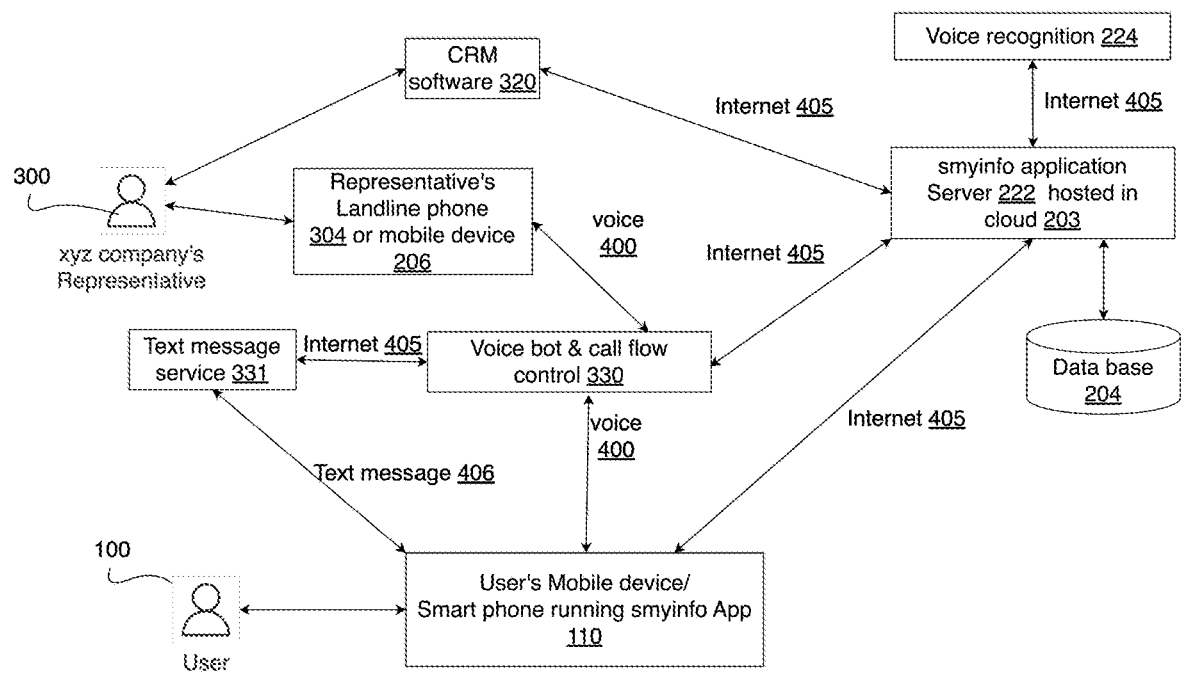
FIG. 7 illustrates a sequence diagram for Smyinfo interaction with Voice Bot (interactive voice response (IVR) system), according to embodiments as disclosed herein.

The various actions in FIG. 6 may be performed in the order presented, in a different order or simultaneously. Further, in some embodiments, some actions listed in FIG. 6 may be omitted FIG. 7 illustrates the system architecture diagram of Smyinfo server (222) interfaced to voice bot & call control flow (330) via internet (405), according to the embodiments herein. The voice bot & call control flow (330) is also connected to the text message service (331) via internet (405). The CRM software (320) is connected to the Smyinfo application server (222) through the Internet (405). The voice bot & call control flow (330) is connected to the representative's land line phone (304) or mobile device (206) via voice communication link (400). The Smyinfo application server (222) is interfaced with voice recognition module (224) to generate the voice biometric during registration process and user recognition utilizing user voice during the automatic permanent user identification number extraction process.

Figure 8:
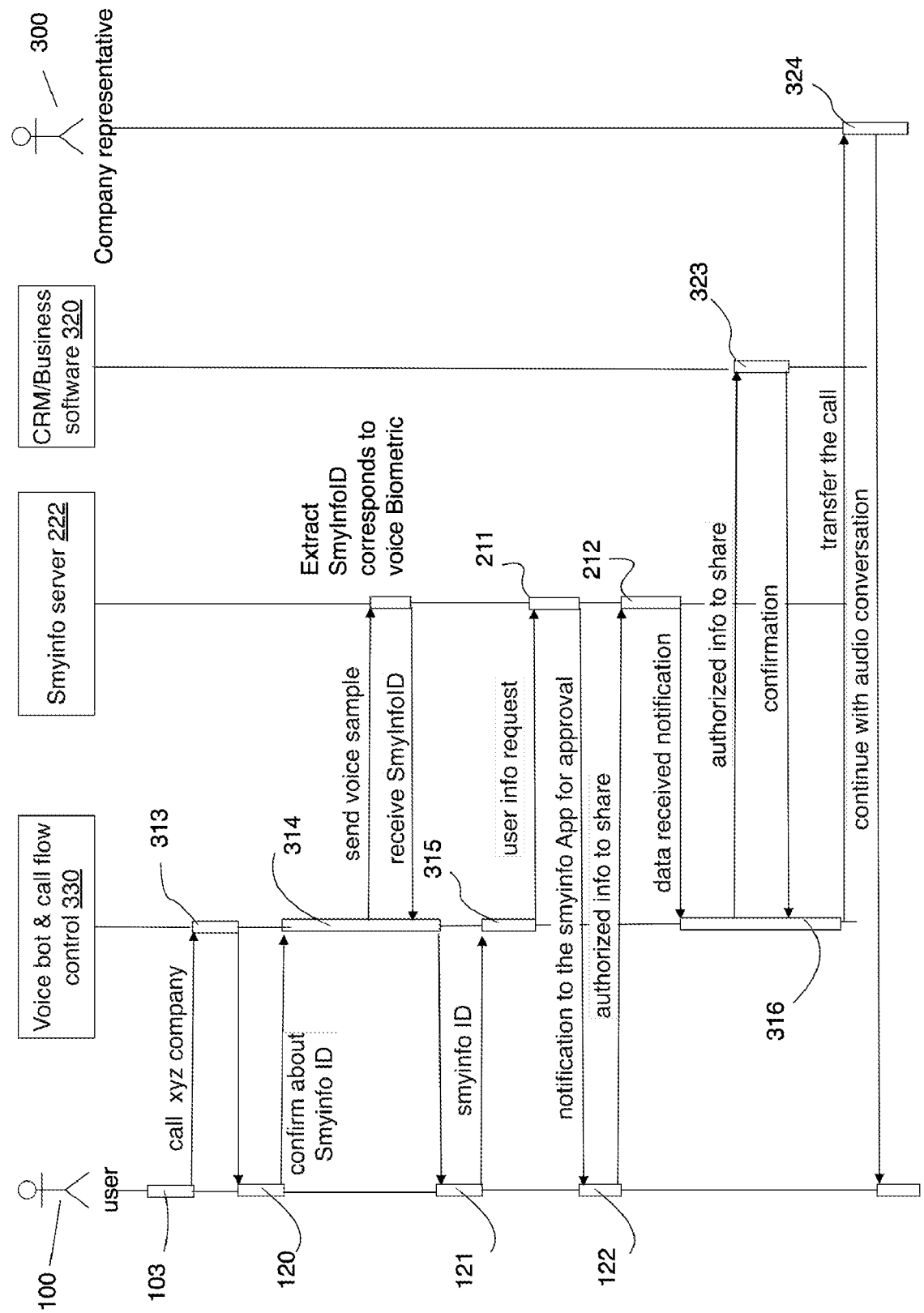
FIG. 8 illustrates a flow diagram for easy, fast, secure, and error-free information sharing with voice bot (interactive voice response (IVR) system), according to embodiments as disclosed herein.

FIG. 8 illustrates the sequence of easy, fast, secure & error-free information sharing with voice bot, according to the embodiments as disclosed herein. At step (103), the user (100) calls the other user or the company's representative (300). The call is received by the voicebot and call flow control module (330), which then verifies with the caller if they possess the Smyinfo ID. In the event that the caller does not have the Smyinfo ID, the voicebot and call flow control module (330) triggers the text message service (331) to dispatch a web link for downloading the Smyinfo App and generating the Smyinfo ID, as detailed in step (313). The user (100) proceeds to generate the Smyinfo ID and confirms its availability, as outlined in step (120). Following this, as outlined in step (314), the voicebot and call flow control module (330) prompts the user to either state or input the Smyinfo ID using their mobile device, in accordance with step (121). However, if the user (100) has already registered with the Smyinfo system and obtained a permanent unique identification number (205), as described in FIG. 2, they can directly enter the permanent unique identification number via their mobile device, or voicebot and call flow control module (330) automatically extract the callers permanent user identification number from Smyinfo App server with the help of voice recognition module and voice biometric stored in the database (204) thereby bypassing step (120). The voicebot and call flow control module (330) then requests all the necessary information from the Smyinfo server (220) using the Smyinfo APIs, as specified in step (315). The Smyinfo server (220) generates a request for approval and sharing of user information, as delineated in step (211). The authorized user approves the requested information for sharing through the Smyinfo App (111), as indicated in step (122). The Smyinfo server (222) retrieves the shared information from the database (204) and transmits it to the voicebot and call flow control module (330) via the Smyinfo APIs, following step (212). If necessary, the voicebot and call flow control module (330) obtains confirmation from the user (100) regarding the shared information and proceeds to share it with the CRM software (320) in step (323). Depending on the circumstances, the voice bot and call flow control module (330) may transfer the call to the company representative (300) to facilitate further conversation with the user (100), as described in step (316). The user (100) and the company representative (300) can then continue their audio conversation as outlined in steps (122) and (324).

Figure 9:
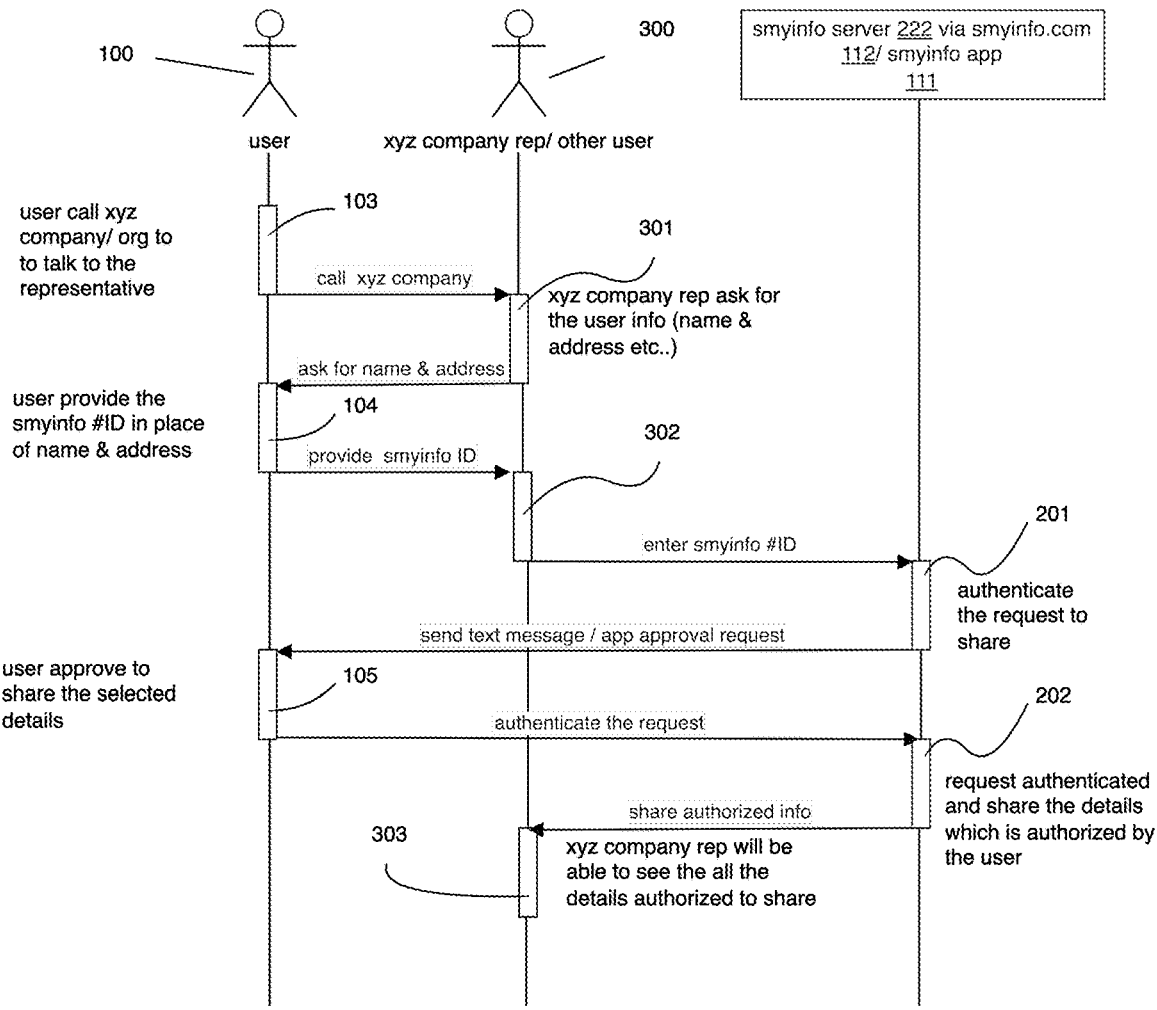
FIG. 9 illustrates a sequence diagram for easy, fast, secure, error free & controlled personal information sharing via App/ website, according to the embodiments as disclosed herein.

The various actions in FIG. 8 may be performed in the order presented, in a different order or simultaneously. Further, in some embodiments, some actions listed in FIG. 8 may be omitted FIG. 9 illustrates the sequence of easy, fast, secure, error free & controlled personal information sharing via Smyinfo App/website, according to the embodiments as disclosed herein. At step 103, the user (100) calls the other user or the company's representative (300). When the company's representative or other user (200) requests personal information (301), the user (100) opts to provide the Smyinfo user ID (205) instead of engaging in the time-consuming and effort-intensive process of communicating the requested personal information, as outlined in step (104). The other user or company's representative (300) enters the Smyinfo user ID (205) into the Smyinfo App (111) or web site (112), as described in step (302). Subsequently, the Smyinfo App (111) or web browser (112) establishes a connection with the Smyinfo server (222) to initiate an authorization request by sending an approval request to the authorized person, as detailed in step (201). The user (100) or the authorized person reviews the request, selects the information to be shared, and approves or rejects the request, in accordance with step (105). The Smyinfo server (222) generates a notification to the company's representative or other user (300) indicating that the request has been approved by the user (100) and that the details are ready to be viewed in the Smyinfo App (111) or website (112), as specified in step (202). The other user or company's representative (300) then utilizes the shared data within the Smyinfo App (111) or web browser (112) to continue the conversation with the user (100), as described in step (303).

Figure 10:
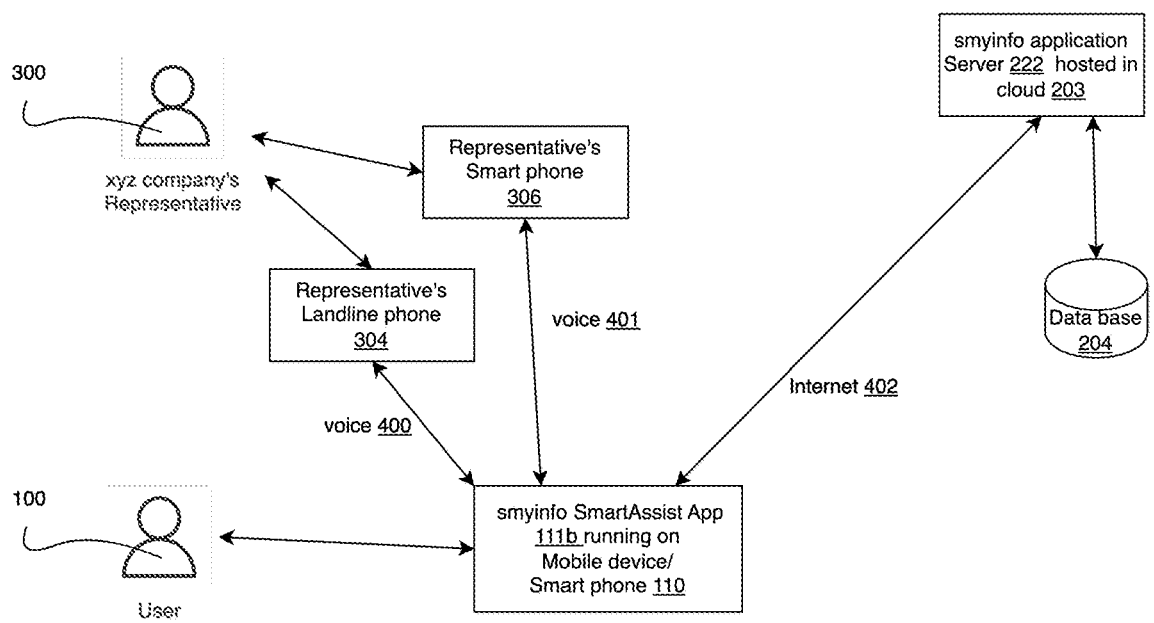
FIG. 10 illustrates a system for easy and controlled sharing of information with smart voice assist App executing on mobile device, according to the embodiments as disclosed herein.
Figure 11:
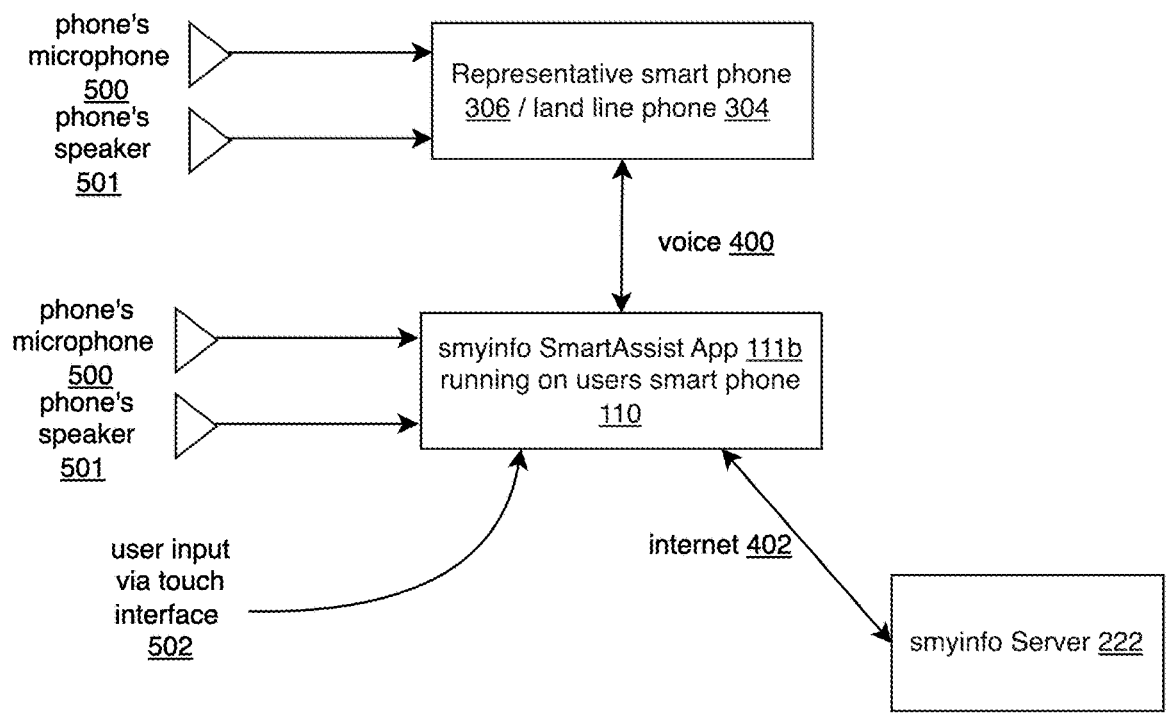
FIG. 11 illustrates a combined system with user & smart voice assist, according to the embodiments as disclosed herein.

The various actions in FIG. 9 may be performed in the order presented, in a different order or simultaneously. Further, in some embodiments, some actions listed in FIG. 9 may be omitted FIGS. 10 and 11 illustrates a dynamic smart voice assistance system to assist the user (100) to communicate the user info (206) stored in the Smyinfo data base (204) to the other user (300), according to the embodiments as disclosed herein. The user's smartphone device (110) operates the Smyinfo Smart Assist app (111*b*), utilizing the microphone (500) and speaker (501) of the mobile device (110) during audio conversations. The Smyinfo Smart Assist app (111b) utilizes the voice channel (400) to establish communication with the other user (300) via a landline phone (304), or employs the voice channel (401) to communicate with the other user (300) via a mobile device (306). The Smyinfo Smart Assist app (111b) establishes a secure communication link over the internet (402) to connect with the Smyinfo server (222) and retrieve information stored in the database (204). The system is configured for dynamically initiating the smart audio assist during the audio conversation using the Smyinfo Smart Assist app (111b) running on the user's own smartphone (110). A secure mechanism is provided between a client application and a centralized server application, according to the embodiments disclosed herein. The system enables communication of the stored information that is authorized to share over the audio conversation using the Smyinfo Smart Assist app (111b). The Smyinfo Smart Assist app (111b) interprets out of context requests and completion of communicating stored information that is authorized to share and hands over the call.

Figure 12:
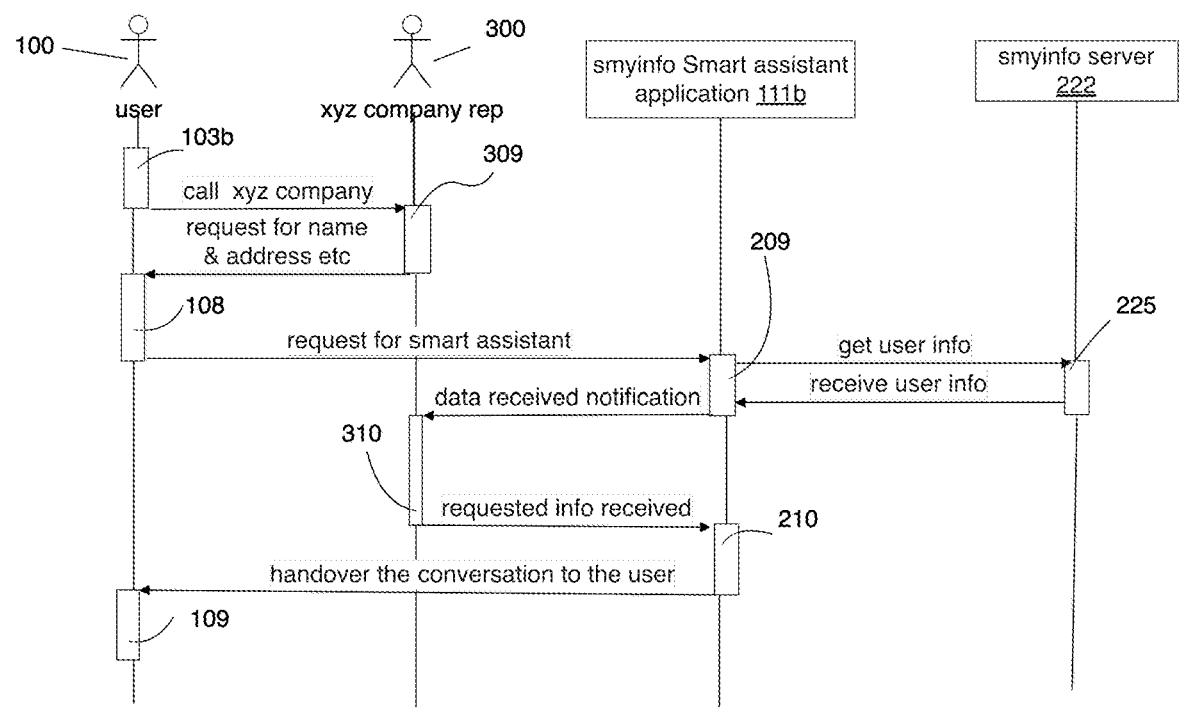
FIG. 12 illustrates a sequence diagram of secure & controlled information sharing with smart voice assist, according to the embodiments as disclosed herein.

FIG. 12 illustrates a method to dynamically request for the smart voice assist to communicate the person information (206) which is stored in the Smyinfo database (204) during audio conversation with the other user (300), according to the embodiments as disclosed herein. The user (100) dynamically initiates an audio call to a representative's smartphone (306) or landline (304) belonging to the other user or XYZ Company, utilizing the Smyinfo Smart Assist app (111b) running on the user's own smartphone (110) as described in step (103b). When the conversation reaches a point where the other user or company representative (300) requests personal information, the user (100) activates the "Request for Assistance" button using the touch interface (502) within the Smyinfo Smart Assist app to engage the help of the Smart Voice Assist, as explained in step (108). Upon the user's request, the Smart Voice Assist application program joins the ongoing audio conversation with the other user or company representative (300) and securely communicates the authorized information to be shared, following step (209). Once all the error-free information has been successfully conveyed to the other user via audio communication, the Smart Voice Assist notifies the user to rejoin the conversation and transfers the control of the conversation to the user, in accordance with step (210). The user (100) can then proceed with the remaining conversation with the other user or company representative as outlined in step (109). By aiding the user in effectively communicating accurate personal information to the other user, the Smart Voice Assist relieves the user from the burden of directly conveying the information stored in the database.

Figure 13:
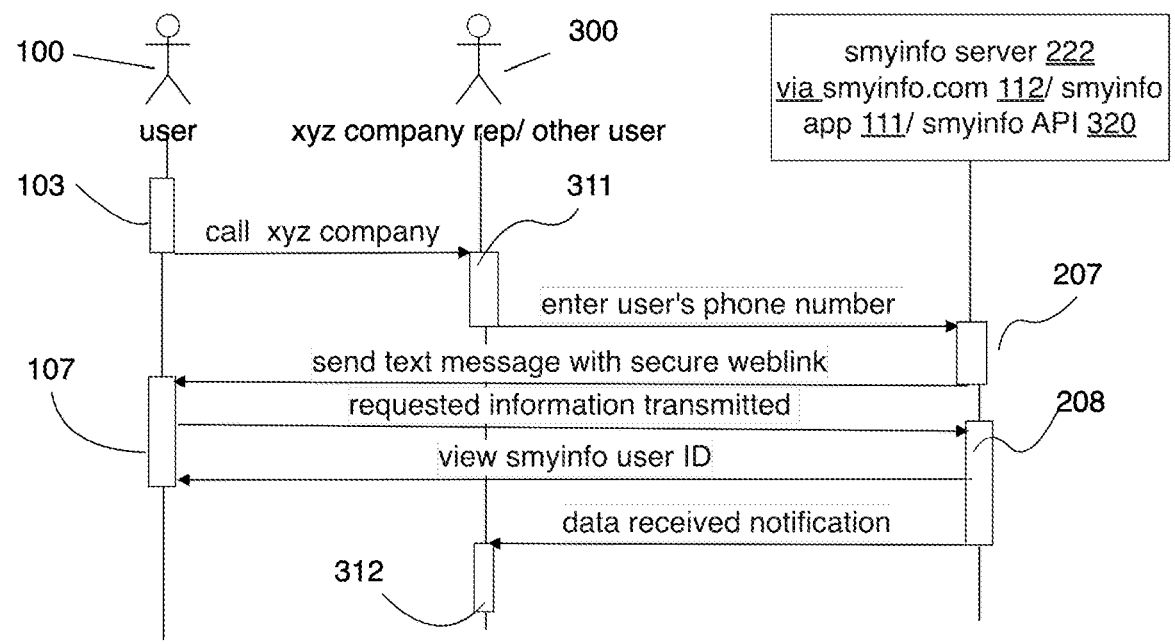
FIG. 13 illustrates a sequence diagram of an alternate flow of secure and controlled information sharing, according to the embodiments as disclosed herein.

The various actions in FIG. 12 may be performed in the order presented, in a different order or simultaneously. Further, in some embodiments, some actions listed in FIG. 12 may be omitted FIG. 13 illustrates an alternate flow of personal information request initiation for the new user's (100) who is not yet registered to Smyinfo server (203), according to the embodiments disclosed herein. When the user (100) initiates a call to the other user or company representative (300) as outlined in step (103), the other user or company representative (300) inputs the user's (100) mobile number into their Customer Relationship Management (CRM) or business software (320), or alternatively, into the Smyinfo.com (112) or Smyinfo app (111), to generate a request for obtaining the required personal information, as described in step (311). The CRM or business software (320) internally leverages the Smyinfo API (320) or connects to the Smyinfo.com web browser or Smyinfo app, which in turn connects to the Smyinfo server (222), to generate a text message containing a secure link for the user (100) to provide the personal information, as explained in step (207). The user (100) then uses the secure Smyinfo weblink to input their personal information and create an account on the Smyinfo application server, obtaining a unique Smyinfo customer ID for future use, following step (107). After the user (100) submits the information, the Smyinfo server generates a notification to the CRM or business software (320) regarding the availability of the approved personal information provided by the user, according to step (208). Once the other user or company representative (300) receives the necessary personal information from the user (100), they can proceed with the ongoing audio conversation as detailed in step (312).

The various actions in FIG. 13 may be performed in the order presented, in a different order or simultaneously. Further, in some embodiments, some actions listed in FIG. 13 may be omitted.

The embodiments disclosed herein can be implemented through at least one software program running on at least one hardware device and performing network management functions to control the network elements. The network elements shown in FIGS. 4 and 5 include blocks, which can be at least one of a hardware device, or a combination of hardware device and software module.

The embodiment disclosed herein specifies a system for a simple, fast, secure, error free, and controlled personal information over an audio conversation. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the system may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments herein can be practiced with modification within the spirit and scope of the claims as described herein.

What is claimed is:

1. A system for simple, error free, secure, and controlled information sharing between one user to the other user during an audio communication, configured to:
   facilitate to enter a user information to share with the other user during audio call and an authorized person to approve the request to share the information to a centralized server application by utilizing one of a web interface and a client application during a user account creation;
   facilitate to generate a permanent unique identification number during the user account creation;
   store a map between the permanent unique user identification number to a corresponding user information to share during the user account creation;
   store a map between the permanent unique user identification number to a corresponding authorized person information during the user account creation;
   facilitate to receive the generated permanent unique identification number to the user utilizing one of web interface and client application during the user account creation;
   facilitate the audio communication;
   facilitate to generate a request for approval to share the user's information during the audio call to the other user utilizing the permanent unique identification number includes:
      other user entering the user's permanent unique identification number received over the audio conversation into one of a CRM, a Business application, a mobile client application, and a web interface to retrieve the approved user information;
      a voicebot configured to receive the permanent unique identification number communicated by a caller via an audio call by an audio to text conversion and generate a request for approval to share user information; and
      the voicebot receiving the permanent unique identification number entered by the caller via a keypad on a mobile device and generate a request for approval to share user information;
   facilitate to request for permission to share the information, by a centralized server application, by sending a notification to an authorized person who is designated to approve in a data base corresponds to the permanent unique identification number entered by other user or voicebot via one of a text and an alert to the authorized user client application;
   provide an option to the authorized person, one of full access, partial access, and rejecting the request utilizing one of the client application and a web interface;
   receiving approval notification from authorized person, by the centralized server application, the other user receives the error free authorized user data by one of the secure web interface, the client application, and populating one of the CRM and the business application.

2. The system of claim 1, wherein the system comprises one of a smart phone to a smart phone over a wireless network, and a smart phone to a landline phone over a network, for facilitating the audio communication.

3. The system of claim 1, wherein the system comprises a remote central server configured for generating permanent unique identification number for each user during account creation, wherein the remote central server is configured to connect a plurality of client applications corresponding to each user.

4. The system of claim 1, wherein the system comprises a database for storing map between system generated permanent unique identification number to the information to be shared.

5. The system of claim 1, wherein the system is configured to control information sharing by one of a text and client application authorization by a designated authorized person.

6. The system of claim 1, wherein the system is configured to perform secured information sharing by one of a secure webpage and a private API interface, and an end to end protected connection between a client and a server application.

7. The system of claim 1, wherein the system is configured to retrieve approved error free shared information by displaying the shared information to the requested other user on one of the client application, a display on a web interface, and by importing to a CRM or a Business application through an API.

8. The system of claim 1, wherein the secure communication mechanism between client application and centralized server application is an end-to-end protected communication over internet.

9. The system of claim 1, wherein the system is configured for executing the client application by using one of a mobile compute device and a computer.

10. The system of claim 1, wherein the system is configured for executing the server application by using a cloud infrastructure.

11. A method for easy, fast, error-free, secure and controlled information sharing between one user to the other user during audio communication utilizing a permanent unique identification number, the method comprising:
   a) entering information by a user to share with other user during audio call and an authorized person to approve the request to share the information to a centralized server application by utilizing one of a web interface and a client application running on a smart mobile device during user account creation;
   b) generating a permanent unique identification number and mapping between the user information and the authorized person to approve information, received in step (a) during the account creation;
   c) receiving a system generated permanent unique identification number to the user utilizing one of web interface and client application during the account creation;
   d) sharing the permanent unique identification number received to the other user over audio call during an audio conversation, when the entered information is needed to be shared to the other user with no errors;
   e) generating request for approval to share the user's information during the audio call to the other user utilizing the permanent unique identification number includes:
      other user entering the user's permanent unique identification number received over the audio conversation into one of a CRM, a Business application, a mobile client application, and a web interface to retrieve the approved user information;
      a voicebot requesting the user to enter the permanent unique identification number utilizing the mobile device and generating request to receive the approved user information; and the voicebot requesting the user to communicate the permanent unique identification number over audio channel, extracting permanent unique identification number utilizing voice to text and generating request to receive the approved user information;

f) requesting for permission to share the information, by a centralized server application, by sending a notification to an authorized person who is designated to approve in a database corresponds to the permanent unique identification number entered by other user or voicebot via one of a text and an alert to the authorized user client application;

g) on receiving the notification, providing an option to the authorized person, one of full access, partial access, and rejecting the request utilizing one of the client application and the web interface; and h) on the authorized person acting on the approval request to share, sharing, by the centralized server application, the other user receives the error free authorized user data by one of the web interface, the client application, and populating one of the CRM and the business application.

* * * * *